(12) United States Patent
Bocktaels et al.

(10) Patent No.: US 9,922,234 B2
(45) Date of Patent: Mar. 20, 2018

(54) BIOMETRIC IDENTIFICATION METHOD

(71) Applicant: MORPHO, Issy-les-Moulineaux (FR)

(72) Inventors: Yves Bocktaels, Issy-les-Moulineaux (FR); Julien Bringer, Issy-les-Moulineaux (FR); Mael Berthier, Issy-les-Moulineaux (FR); Marcelin Ragot, Issy-les-Moulineaux (FR)

(73) Assignee: MORPHO, Issy-les-Moulineaux (FR)

( * ) Notice: Subject to any disclaimer, the term of this patent is extended or adjusted under 35 U.S.C. 154(b) by 0 days.

(21) Appl. No.: 15/184,334

(22) Filed: Jun. 16, 2016

(65) Prior Publication Data

US 2016/0371531 A1 Dec. 22, 2016

(30) Foreign Application Priority Data

Jun. 16, 2015 (FR) ...................... 15 55508

(51) Int. Cl.
| | | |
|---|---|---|
| *G06K 9/00* | (2006.01) | |
| *G06F 21/32* | (2013.01) | |
| *G06K 9/62* | (2006.01) | |
| *G06K 9/52* | (2006.01) | |
| *G06T 3/00* | (2006.01) | |

(52) U.S. Cl.
CPC ......... *G06K 9/00073* (2013.01); *G06F 21/32* (2013.01); *G06K 9/00926* (2013.01); *G06K 9/52* (2013.01); *G06K 9/62* (2013.01); *G06T 3/0093* (2013.01)

(58) Field of Classification Search
CPC .. G06K 9/00073; G06K 9/00926; G06K 9/52; G06K 9/62; G06F 21/32; G06T 3/0083
See application file for complete search history.

(56) References Cited

U.S. PATENT DOCUMENTS

| | | | | |
|---|---|---|---|---|
| 8,280,740 | B2 * | 10/2012 | Di Mambro | G06F 21/32 704/243 |
| 2006/0169769 | A1 * | 8/2006 | Boyarsky | G06Q 20/18 235/381 |
| 2010/0092048 | A1 | 4/2010 | Pan et al. | |

(Continued)

FOREIGN PATENT DOCUMENTS

| | | |
|---|---|---|
| WO | WO 2006/044917 A2 | 4/2006 |
| WO | WO 2006/044917 A3 | 4/2006 |

OTHER PUBLICATIONS

Maël Berthier, et al., "Studying Potential Side Channel Leakages on an Embedded Biometric Comparison System", International Association for Cryptologic Research, Jan. 9, 2014, 14 pages.

(Continued)

*Primary Examiner* — Gregory M Desire
(74) *Attorney, Agent, or Firm* — Muncy, Geissler, Olds & Lowe, P.C.

(57) ABSTRACT

A biometric identification method comprising the steps of comparing a candidate print with a reference print and validating identification as a function of a number of characteristics that are common in the two prints and of a predetermined validation threshold, the method being characterized in that it comprises the steps of altering the biometric characteristics of one of the two prints prior to comparison and of taking the alteration into account during validation.

10 Claims, 1 Drawing Sheet

(56) References Cited

U.S. PATENT DOCUMENTS

| | | | | |
|---|---|---|---|---|
| 2010/0142764 | A1* | 6/2010 | Ikegami | G06K 9/00006 |
| | | | | 382/115 |
| 2011/0038012 | A1* | 2/2011 | Massicot | H04N 1/32133 |
| | | | | 358/3.28 |
| 2014/0095885 | A1 | 4/2014 | Bringer et al. | |
| 2015/0067344 | A1* | 3/2015 | Poder | G06F 21/316 |
| | | | | 713/176 |
| 2015/0110367 | A1* | 4/2015 | Kumar | G06K 9/00087 |
| | | | | 382/124 |
| 2016/0371531 | A1* | 12/2016 | Bocktaels | G06K 9/52 |

OTHER PUBLICATIONS

Taoufik Chouta, et al., "Side channel analysis on an embedded hardware fingerprint biometric comparator & low cost countermeasures", HASP '14 Proceedings of the Third Workshop on Hardware and Architectural Support for Security and Privacy, Jun. 15, 2014, 6 pages.

Apostolos P. Fournaris, et al., "Secure embedded system hardware design—A flexible security and trust enhanced approach", Computers & Electrical Engineering, vol. 40, Iss. 1, Jan. 2014, pp. 121-133.

\* cited by examiner

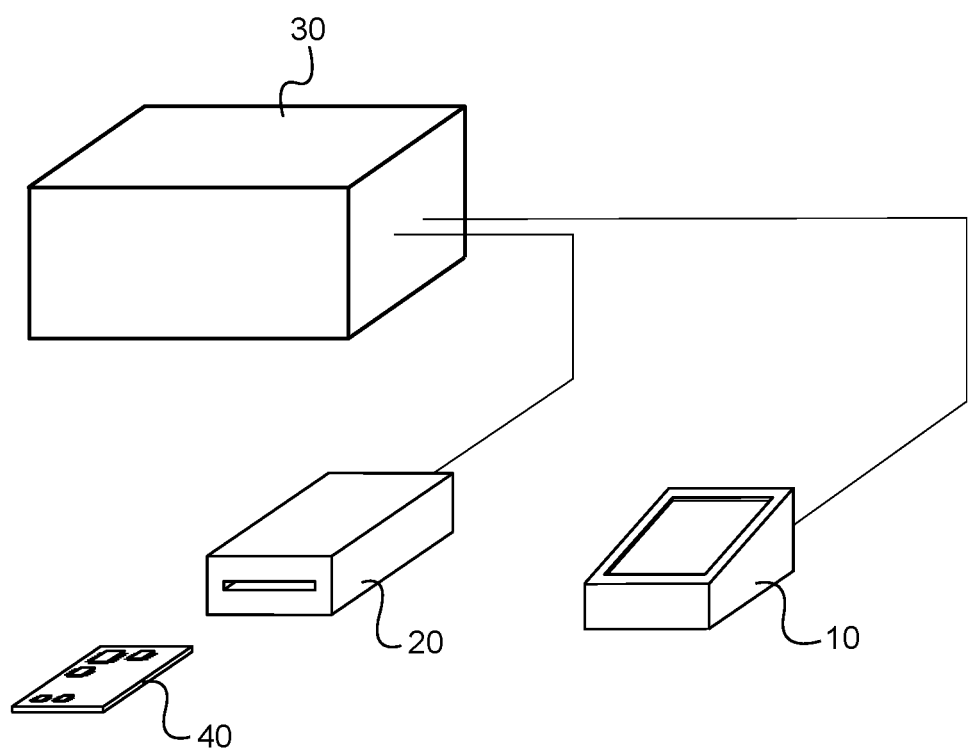

BIOMETRIC IDENTIFICATION METHOD

The present invention relates to biometric measurement and more particularly to a method of biometric identification. In the present document, the term "print" is used to designate a set of biometric characteristics, or "minutiae", of a person, and in particular a set of biometric characteristics of at least one of that person's fingers, a palm, a portion of a network of veins, an iris of at least one eye, the face, an ear, or indeed characteristics of the voice.

STATE OF THE ART

Biometric identification is based on comparing a candidate print with a reference print. The reference print is stored in a memory such as that of a smart card or of a computer server, and the comparison is performed by an integrated circuit (that of the smart card or one of those in the server). The candidate print is captured from the person whom it is desired to identify. The comparison seeks to determine a score for the candidate print as a function of the proximity between the characteristics of the candidate print and of the reference print. The person to be identified is validly identified when the score for the candidate print exceeds a predetermined threshold.

There exist techniques of attack that consist in analyzing the electricity consumption of the integrated circuit, its time of execution, and the electromagnetic radiation it produces during successive identification operations that are performed on a single candidate print to which small modifications are made from one identification operation to another. The purpose of analyzing the power supply, the execution time, and the electromagnetic radiation of the integrated circuit is to determine the impact of modifications to the candidate print on the parameters being analyzed and to deduce therefrom how the score that results from these modifications varies. Although such analysis takes a long time, if carried out thoroughly it nevertheless makes it possible to prepare a candidate print that is capable of being identified as valid.

OBJECT OF THE INVENTION

An object of the invention is to provide means for improving the ability of identification methods to withstand attacks.

BRIEF SUMMARY OF THE INVENTION

To this end, the invention provides a biometric identification method comprising the steps of comparing a candidate print with a reference print and validating identification as a function of a number of characteristics that are common in the two prints and of a predetermined validation threshold. The method comprises the steps of altering the characteristics of one of the two prints prior to comparison and of taking the alteration into account during validation.

Thus, when the identification algorithm is attacked by making successive modifications to a given candidate print, part of the variation in the score stems from account being taken of characteristics that have been altered, thereby spoiling the result of the attack. The attacker has no way of knowing whether the variation in the score stems from account being taken of altered characteristics, so selecting which attacker modifications should be retained is made complex and difficult, if not impossible.

Other characteristics and advantages of the invention appear on reading the following description of particular, non-limiting implementations of the invention.

BRIEF DESCRIPTION OF THE FIGURE

Reference is made to the sole accompanying FIGURE which is a diagrammatic view of an identification device for performing the method of the invention.

DETAILED DESCRIPTION OF THE INVENTION

The invention is described herein in application to biometric identification on the basis of a fingerprint. Naturally, the invention is applicable to any type of biometric measurement and may apply for example to the characteristics of an iris of at least one eye, the characteristics of a network of veins, the characteristics of the face or of an ear, the characteristics of the voice, . . . .

With reference to the sole FIGURE, the method of the invention is performed by an identification device comprising: at least one fingerprint capture member 10; a smart card reader 20; a computer unit 30 connected to the capture device 10 and to the reader 20; and at least one smart card 40. In this example, the fingerprint capture member 10 comprises an optical sensor, but other technologies could be used. In this example, the reader 20 is a contact type reader. In this example, the computer unit 30 comprises a processor and memories, and it is arranged to execute a first program performing the method of the invention.

The integrated circuit of the smart card 40 comprises a processor and a memory for executing a second program performing the method of the invention by means of an algorithm for processing and comparing fingerprints (this is referred to below as the "matching" program). The smart card 40 is given to a user of the device. The memory in the card also contains the characteristics of a reference fingerprint constituted by a fingerprint of the user to whom the smart card 40 has been given, and possibly identification of the user, such as a name, and rights associated with the user, such as the right to penetrate into such-and-such premises, or to access such-and-such files, documents, or information, . . . .

Thus, in known manner, prior to performing the identification method, an enrolment operation is performed during which:

biometric characteristics of a reference print of the user are captured; and these biometric characteristics of the reference print are stored in the memory of the integrated circuit of the smart card.

The biometric identification method of the invention begins by the steps of:

capturing biometric characteristics of a candidate print from the same finger of a candidate for identification; and transmitting them to the integrated circuit in the card, which performs the matching algorithm.

These steps are performed by the computer unit 30 controlling the fingerprint capture member 10 and the smart card reader 20.

The matching method comprises the following steps:

aligning the biometric characteristics of the candidate print so that the candidate print is oriented and centered in the same manner as the reference print;

comparing the biometric characteristics of the candidate print with the biometric characteristics stored in the reference print;

calculating a score for the candidate print as a function of a number of characteristics that are common to both prints; and validating identification if the score of the candidate print is greater than a predetermined validation threshold.

The biometric characteristics of the prints are compared by attempting to match each biometric characteristic of the candidate print with one of the biometric characteristics of the reference print. The score is calculated as a function of the number of matches found.

These steps are themselves known and are not described in detail herein.

In the invention, the method further comprises the steps of altering some of the characteristics of one of the two prints prior to making the comparison in order to take account of the alteration during validation.

Three particular implementations of the identification method of the invention are described below.

In the first implementation, the alteration comprises an operation of masking a portion of the biometric characteristics of the candidate print.

In this example, the masking is performed by generating a random vector (e.g. non-signed eight-bit integers) having the same size as the number of characteristics of the print. The masking is performed after each extraction of candidate print characteristics. Each characteristic of the print is conserved if the value of the vector associated with the print is less than a predefined value (230, for example, for 10% masking).

This masking operation takes place before the biometric characteristics are compared, and possibly before the operation of aligning the candidate print.

The masking applies to 10% to 20% of the biometric characteristics of the candidate print and is defined randomly after each capture of a candidate print. Thus, a same candidate print captured and compared two times in succession will not give the same score.

Naturally, the calculation of the score takes account of the fact that only 80% to 90% of the candidate print is visible.

In a variant, the masking is applied to the reference print.

If biometric characteristics added to the candidate print by the attacker correspond to non-masked biometric characteristics of the reference print, then the score varies favorably during identification. However, on the next identification, the biometric characteristics of the reference print that are masked are different from the preceding occasion and it is probable that some of the previously added biometric characteristics will no longer correspond to the non-masked biometric characteristics of the reference print. Thus these biometric characteristics previously added to the candidate print that previously made the score rise, will not have any favorable effect thereon.

In the second implementation, the alteration comprises an operation of deforming a portion of the biometric characteristics of the reference print.

The deformation relates to X position, Y position, or angle. The X or Y position is coded on eight bits and the deformation then consists in modifying two of the values of these eight bits. For example, the X and Y value is modified up to a maximum of ±2 over the 256 possible values for X and Y (which represents a maximum variation of 0.78% in the range of values). Angle is coded on four bits and the deformation consists in modifying one of the values of these bits. For example, the value of the angle is modified up to a maximum of ±1 over the 128 possible values for the angle (which represents a maximum variation of 1.57% of the range of values).

This deformation is determined randomly and is applied prior to each alignment.

As a result the score can vary because of the matching of a biometric characteristic of the candidate print with a deformed biometric characteristic of the reference print.

If an attacker were to present the same print twice over, the score would not be identical on both identifications. Introducing such a random quantity complicates reconstruction of all or part of the reference print.

In a third implementation, the alteration comprises an operation of adding fake biometric characteristics randomly selected from a library of fake biometric characteristics stored in the memory of the smart card.

The algorithm calculates two scores, namely a first score that varies as the biometric characteristics of the candidate print are matched with real biometric characteristics of the reference print and a second score that varies as biometric characteristics of the candidate print are matched with fake biometric characteristics of the reference print. Preferably, when one of the biometric characteristics of the candidate print cannot be matched with real or fake biometric characteristics of the reference print, then the second score is increased.

Validation takes place at the end of comparison when the first score is greater than a predetermined threshold.

In a variant of the third implementation, fake biometric characteristics are added to the real biometric characteristics once only during enrolment. To make attacks more difficult, it is necessary for the number of fake biometric characteristics that are added to be not less than, and preferably greater than, the number of real biometric characteristics of the reference print.

As the biometric characteristics of the candidate print are matched with real or fake biometric characteristics of the reference print, the score is calculated and a ratio is calculated between the number of matched real biometric characteristics and the number of matched fake biometric characteristics.

For identification to be validated, it is necessary that:
the score is greater than the predetermined threshold; and
the ratio is greater than a predetermined value, in this example two.

Validation is thus possible only if the number of matched real biometric characteristics is not less than twice the number of matched fake biometric characteristics.

In order to ensure that these two conditions are complied with, when the score comes into the vicinity of the predetermined threshold while the ratio has not reached the predetermined value, variation in the score is blocked so long as the ratio has not exceeded the predetermined value. In order to avoid stagnation of the score raising the suspicions of an attacker, it is possible to envisage causing the score to vary a little and randomly on each occasion a fake biometric characteristic is matched, but without that causing the score to exceed the threshold.

As an alternative to this variant, and as before, it is possible to calculate a first score relating to the matches of real biometric characteristics and a score relating to the matches of fake biometric characteristics. These two calculations need to be performed in symmetrical manner to avoid being revealed to a potential attacker.

Naturally, the invention is not limited to the implementations described but covers any variant coming within the ambit of the invention as defined by the claims.

In particular, the alteration may be applied to the reference print or to the candidate print.

When the alteration is masking applied to the reference print, the masking is preferably performed prior to each identification, after loading the print into memory prior to comparison.

The type of alteration may be modified after each identification, or the type of alteration may be selected randomly.

The alteration applies to a majority of the characteristics or less, but to a significant fraction thereof, i.e. a fraction that is sufficient to modify perceptibly the score from one comparison to another for the same candidate print that has been altered differently for the two comparisons.

The fake minutiae may also be selected and different for each new stage of matching. They may be selected using methods that make it possible to simulate as well as possible true minutiae by relying on the reference print.

Any type of matching algorithm can be used, e.g. an algorithm operating on the basis of distances between minutiae, without prior alignment.

The biometric characteristics may be supplied directly by a reader member or by a biometric capture member, or they may be transferred, e.g. from a database, or they may be captured.

The term "print" is used in the present document to designate a set of biometric characteristics of a person, such that the invention is not limited in any way to an application to fingerprints.

The invention claimed is:

1. A biometric identification method comprising:
    comparing a candidate print with a reference print;
    validating identification as a function of a number of characteristics that are close in the two prints and of a predetermined validation threshold; and
    altering the biometric characteristics of one of the two prints prior to comparison and of taking the alteration into account during validation,
    wherein the alteration comprises adding fake biometric characteristics to real biometric characteristics of the print,
    wherein the fake biometric characteristics are added to the real biometric characteristics of the reference print, and
    wherein validation comprises calculating a first score that varies as the biometric characteristics of the candidate print are matched with real biometric characteristics of the reference print, and a second score that varies as biometric characteristics of the candidate print are matched with fake biometric characteristics of the reference print, validation taking place at the end of the comparison when the first score is greater than the predetermined threshold.

2. The method according to claim 1, including, prior to the comparison, a step of aligning the prints, the print being altered prior to the print being aligned.

3. The method according to claim 1, wherein the alteration comprises masking a portion of the print.

4. The method according to claim 1, wherein the alteration comprises deforming at least a portion of the print.

5. The method according to claim 1, wherein when one of the biometric characteristics of the candidate print cannot be matched with real or fake biometric characteristics of the reference print, the second score is increased.

6. A biometric identification method comprising:
    comparing a candidate print with a reference print;
    validating identification as a function of a number of characteristics that are close in the two prints and of a predetermined validation threshold; and
    altering the biometric characteristics of one of the two prints prior to comparison and of taking the alteration into account during validation,
    wherein the alteration comprises adding fake biometric characteristics to real biometric characteristics of the print,
    wherein the fake biometric characteristics are added to the real biometric characteristics of the reference print,
    wherein while biometric characteristics of the candidate print are matched with real or fake biometric characteristics of the reference print, there are calculated a score and a ratio between the number of matched real biometric characteristics and the number of matched fake biometric characteristics, and
    wherein for identification to be validated, it is necessary for:
        the score to be greater than the predetermined threshold; and
        the ratio to be greater than a predetermined value.

7. The method according to claim 6, wherein, when the score comes into the vicinity of the predetermined threshold while the ratio has not reached the predetermined value, the score is caused to vary randomly on each matching with a fake biometric characteristic, but without that causing the score to exceed the threshold.

8. The method according to claim 6, including, prior to the comparison, a step of aligning the prints, the print being altered prior to the print being aligned.

9. The method according to claim 6, wherein the alteration comprises masking a portion of the print.

10. The method according to claim 6, wherein the alteration comprises deforming at least a portion of the print.

* * * * *